United States Patent [19]  [11] 4,153,433
Kihlström  [45] May 8, 1979

[54] METHOD AND APPARATUS FOR FILTERING OUT SOLID PARTICLES FROM A GAS WITH PEAT LITTER

[76] Inventor: Christer Kihlström, Pl. 3014, Skara, Sweden, 532 00

[21] Appl. No.: 782,954

[22] Filed: Mar. 30, 1977

[30] Foreign Application Priority Data

Mar. 31, 1976 [SE] Sweden ............................. 7603809

[51] Int. Cl.² ...................... B01D 46/00; B01D 46/12
[52] U.S. Cl. ........................................ 55/97; 55/484; 55/487; 55/518; 55/528
[58] Field of Search ............................. 55/74, 77–79, 55/97–99, 309, 484, 485, 387, 487, 486, 512, 518, 528; 210/290, 502; 252/427

[56] References Cited

U.S. PATENT DOCUMENTS

| | | | |
|---|---|---|---|
| 3,148,962 | 9/1964 | Dellinger et al. | 210/290 |
| 3,912,472 | 10/1975 | Marble | 55/387 |
| 4,004,897 | 1/1977 | Squires | 55/487 |

FOREIGN PATENT DOCUMENTS

| | | | |
|---|---|---|---|
| 133159 | 10/1919 | United Kingdom | 55/74 |
| 737665 | 9/1955 | United Kingdom | 55/387 |

*Primary Examiner*—Bernard Nozick
*Attorney, Agent, or Firm*—Holman & Stern

[57] ABSTRACT

Method and apparatus for filtering a gaseous medium such as welding gas to remove solid particles therefrom. The gaseous medium is passed through a bed having at least two strata of peat litter, wherein the peat litter particles have been screened in such a manner that the first layer as seen in the direction of gas flow comprises particles having sizes ranging from a certain predetermined value and upwards, and the second layer or stratum has particles the sizes of which lay below the said predetermined value. A coating successively builds up in the first layer of peat litter contributing to the filtering effect, whereas the second peat litter layer during this building up period will perform the major part of the filtration.

10 Claims, 4 Drawing Figures

METHOD AND APPARATUS FOR FILTERING OUT SOLID PARTICLES FROM A GAS WITH PEAT LITTER

BACKGROUND OF THE INVENTION

The present invention refers to a method for filtering out solid particles from a gaseous medium and a filter for performing the method.

In the prior art for the purpose of filtering out solid particles from a gaseous medium, mainly paper-based filters of different designs have been used. This type of filter is rather reliable and cheap. When used for filtering of welding gases this type of filter suffers from a drawback in that a certain time of use is required before the solid particles from the flowing gases medium will be caught in full by the filter. This depends on the fact that the solid particles must form a coating on the surface of the paper in order to give this a sufficient tightness before a satisfactory filtering is achieved.

Filters for similar purposes have also been designed, which work with electrostatic separation of the particles from the gaseous medium but these filters are comparatively expensive—it is for instance necessary to use a high-tension generator—and they are rather sensitive to different kinds of external influence.

SUMMARY OF THE INVENTION

The purpose of the present invention is to present a method for filtering out solid particles from a gaseous medium, which method is cheap and efficient to use and which has a full filtering capacity right from the beginning of its use. This is obtained wherein the gas to be filtered is fed through at least one bed of stratified peat litter in which the peat litter has been arranged in at least two layers with mutually different particle sizes, the gas thereby being guided in such a manner that it will first pass through a first layer containing peat litter from a large size screening series and immediately thereupon through a second layer containing peat litter from a fine size screening series.

According to a preferred embodiment each bed of peat litter is arranged in a box element. At least two such box elements are placed in a housing provided with one inlet and at least one outlet in such a manner that each two adjacent box elements will have their outlet or inlet openings facing each other, means thereby being arranged in the housing for guiding the flow of gas from the housing inlet through the box element or box elements respectively in a direction from the said first peat litter layer of larger particle size towards the said second peat litter layer of smaller particle size.

The invention also includes a filter for performing the method and this filter is characterized mainly in that it comprises at least one bed of stratified peat litter, which bed is enclosed in a box element having openings for gas passage provided in its flat side surfaces and wherein a first layer contains peat litter from a large size screening series and a second layer contains peat litter from a fine size screening series as seen in the gas flow direction, the box elements being arranged in a housing provided with means for guiding a gas flow through the box elements.

In a preferred embodiment of the invention, the housing is provided with side channels, a first one of which being arranged to connect a gas inlet opening with the side of each box element having the first peat litter layer whereas the second side channel is arranged to connect the side of each box element adjacent the second peat litter layer with at least one outlet opening provided in the housing.

Each box element is preferably provided with wall members, designed to form at least parts of the housing when a plurality of such box elements are assembled to a filter unit. For obtaining a good volumetric efficiency it is advantageous if the box elements in the housing are arranged in such a manner that each two adjacent box elements will have their inlet or their outlet openings respectively facing each other. It is also preferable that diagonally opposite short side edges of each box element are each provided with an extension of the short side wall, said extensions projecting past the plane of the associated flat side surface a distance corresponding to half the distance between two adjacent, assembled box elements, two such extensions when mounted in opposite directions thereby forming a substantially gas-proof wall against the adjacent gas channel.

For ensuring that the gas to be filtered is positively passing through the peat litter bed, each box element can be provided with an internal flange projecting from the side wall towards the interior of the box element and ending in the peat litter bed, said flange being intended to prevent gas from passing between the peat litter bed and the side wall of the box element.

DESCRIPTION OF THE PREFERRED EMBODIMENTS

Figure 1:
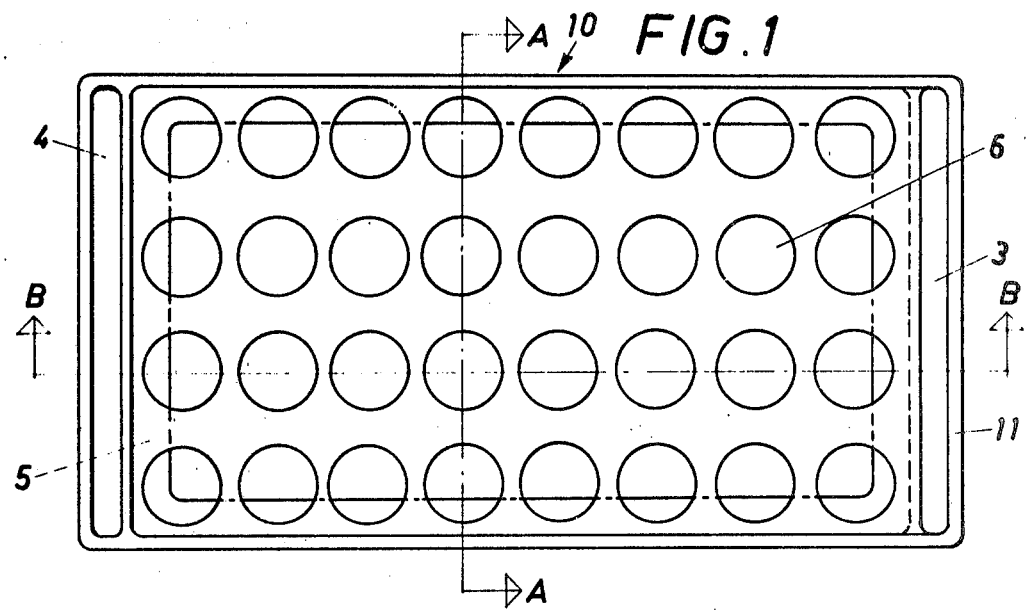
FIG. 1 shows in a plan view, a box element which encloses a stratified bed of peat litter according to the invention.
Figure 1B:
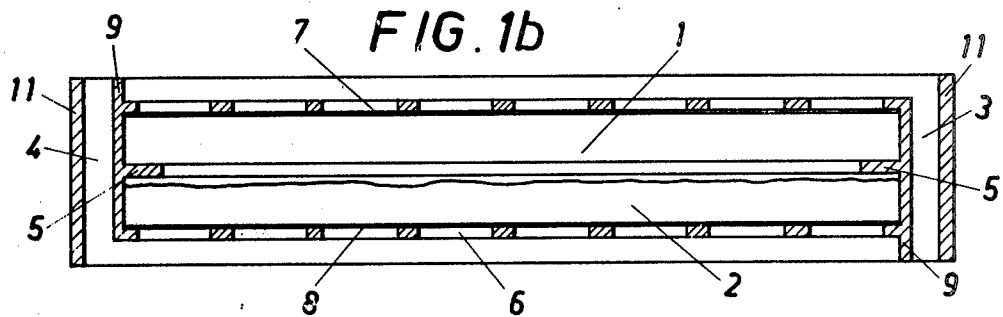
FIG. 1b is a section along line B—B in FIG. 1.
Figure 1A:
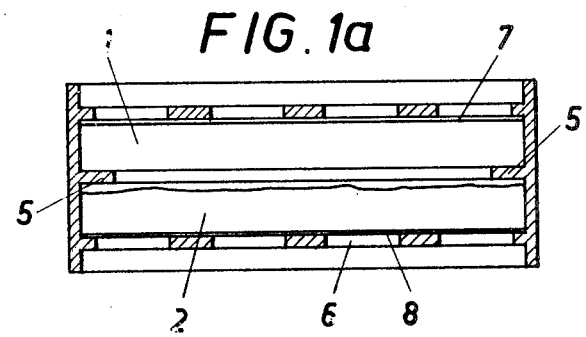
FIG. 1a is a section along line A—A in FIG. 1.

FIG. 1 shows in a plan view a box element 10 according to the invention. In FIG. 1a is shown a cross section through the box element according to FIG. 1 as seen along line A—A. FIG. 1b shows a section B—B through the same box element. This box element 10 encloses a bed of peat litter comprising a layer 1 from a large size screening series and a more dense layer 2 from a more fine-sized screening series. This bed is enclosed between substantially plane flat-side surfaces of the box element which is further provided with channels 3 and 4 respectively arranged in the direction of flow along the sides of the peat litter bed, but separated from this, which channels are intended to carry the unfiltered and the filtered gases respectively. In the portion of the box element, which encloses the peat litter bed is arranged a flange 5, which projects in a direction mainly perpendicular to the direction of flow. The flange 5 will guarantee that the gas flow positively will be urged inwards for passing through the peat litter bed and that it cannot follow the fine space between the peat litter bed and the portion of the box element which encloses the bed. In the two plane flat side surfaces of the box element there are arranged a series of openings 6 for gas passage. As can be seen from FIGS. 1a and 1b layer 1, which contains peat litter from a large size screening series, is separated from its adjoining flat side surface of the box element by means of a net 7, having a mesh size of about 5 mm. This net 7 will prevent the large sized portion of the peat litter bed from falling out through the openings 6 in the flat side surface of the box element turned against said layer 1. A retaining member 8 is in a corresponding manner arranged between the opposite flat side surface of the box element and the peat litter layer 2 which contains peat litter from a more fine-sized screening series. This retaining member 8 can preferably be a paper which has such a sparse texture that it will have no filtering effect but still is so dense that the fine filter layer will be prevented from falling out of the box element through the flow openings 6 in the adjacent flat side surface of the box element. The box element 10 as can be seen is provided on two opposite sides with a wall 11 located outside the very peat litter container, and these walls 11 form channels 3 and 4 which are open at both sides.

Figure 2:
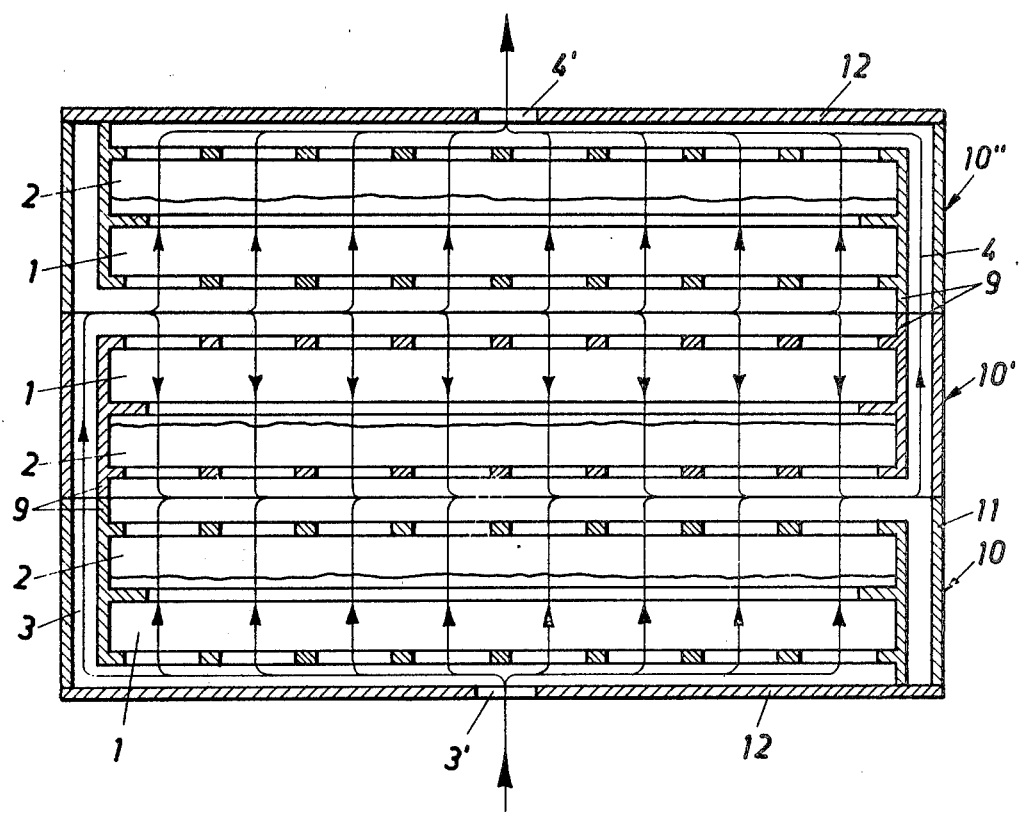
FIG. 2 is a section corresponding to FIG. 1b showing a filter unit incorporating three box elements according to FIG. 1, which together form a housing.

Three box elements 10, 10' and 10" as shown in FIG. 2 which each corresponds to the box element 10 shown in FIG. 1. These box elements have been assembled to a filter unit. In the embodiment shown, the box elements have been connected in parallel in opposed direction, i.e. in such a manner that each pair of adjacent box elements will have the outlet or inlet openings respectively turned against each other. From FIG. 1b, it can be seen that each box element is provided with extensions 9, which project from diagonally opposite end edges of the wall structure enclosing the peat litter bed. The extensions 9 extend past the plane of the associated side surface a distance which corresponds to half the intended distance between two assembled box elements. FIG. 2 shows that two opposed extensions 9 in mounted state hereby will form a substantially gas tight portion of the wall between the peat litter bed and the channels 3 and 4, whereby the gas always will be transferred through the box elements in the same direction; from more large-sized to more fine-sized peat litter particle size. The outer walls 11 of the box elements form the outer walls of the surrounding housing in the embodiment shown, and this housing is provided with end walls 12, which in suitable manner are air-tightly fitted to the walls 11. These end walls 12 are provided with an inlet 3' and at least one outlet 4' for the gas.

The filter unit shown in FIG. 2 comprises a plurality of box elements connected in parallel and this unit will give a lower flow rate and consequently a better volumetric efficiency of the filter unit.

The box element 10 is preferably made from a plastic material but it can also be made from cardboard. The formation of the peat litter in strata can preferably be brought about by screening the used peat litter bulk through a screen having a mesh size of 4 mm. The portion of the peat litter bulk which will fall through the screen has a particle size, which extends over a range from about 4 mm and downwards and this portion is in this application referred to as the fine size screening series, whereas the portion of the peat litter bulk, which will stay in the screen and consequently have a particle size of above 4 mm and upwards is referred to as the large size screening series. The layer with fine size peat litter particles shall preferably be 25-30 mm thick. The layer of more large sized material, which will stay in the screen, is preferably placed upon the fine size layer in a layer being 60-70 mm thick. These values are only to be consider as preferred values and it is possible to use screens having other mesh sizes and also to use other layer thicknesses than the values stated hereabove.

When the gaseous medium is fed through the bed of peat litter it will, when passing through the layer with peat-litter from a large size screening series, form a successively grooving coating in this layer. The gas particles which at the beginning of the filtering cannot be retained in the large sized layer will be captured by the layer of peat litter from the fine sized screening series, as this comprises smaller peat litter particles which form a finer and more dense filter material. When the more large sized layer starts to build up a coating will it become more and more dense from the inside and the particles from the gaseous medium will meet more and more resistance and can therefore not reach the more fine sized layer and this layer can therefore not be filled up. A deep acting filter which is fully effective already from the beginning of the filtering is therefore obtained. As each layer of the peat litter bed incorporates stratified peat litter from a certain predetermined screening series, the layer in question will contain particles being of a number of different particle sizes, which efficiently will contribute to the deep action of the filter.

As it is possible to assemble the box elements according to the invention to larger units, it is possible without use of especial expensive steps to build a filter unit,

What I claim is:

1. A method of filtering out solid particles from a gaseous medium comprising feeding the gaseous medium into a housing having at least one bed of stratified peat litter, said bed comprising at least a first and a second layer of peat litter, each with mutually different particle sizes, said first layer containing peat litter from a large-size screening series, said second layer containing peat litter from a fine-size screening series; passing the gaseous medium through said first layer first and thereafter through said second layer; and removing the gaseous medium from said housing.

2. The method of claim 1, further comprising providing said housing with a plurality of said beds, each said bed being arranged in a box element having an inlet side adjacent said first layer and an outlet side adjacent said second layer, said housing having means for guiding the flow of the gaseous medium through said box elements in parallel wherein said gaseous medium is passed through said box elements in parallel.

3. A filter for filtering out solid particles from a flowing gaseous medium comprising
   at least one bed of stratified peat litter having a first layer containing peat litter from a large size screening series and a second layer containing peat litter from a fine size screening series, said first and second layers being so oriented as seen in the gas flow direction;
   at least one box element having openings for gas passage provided in its opposed flat side surfaces enclosing at least said one bed; and
   a housing enclosing said at least one box element, said housing having at least one gas inlet opening, at least one gas outlet and means for guiding the gas flow between said inlet opening, said at least one box element and said at least one gas outlet opening.

4. The filter as claimed in claim 3, wherein said means for guiding comprises side channels in said housing, a first one of which being arranged to connect said gas inlet opening with the side of each box element having the said first peat litter layer and a second side channel is arranged to connect the side of each box element adjacent the said second peat litter layer with said at least one gas outlet opening provided in the housing.

5. The filter as claimed in claim 3, wherein each box element is provided with wall members, designed to form at least parts of the said housing when a plurality of such box elements are assembled in a filter housing.

6. The filter as claimed in claim 3, wherein said box elements in the housing are arranged in such a manner that each two adjacent box elements will have their inlets facing each other and two adjacent box elements which inludes one of the previous pair will have their outlets facing each other.

7. The filter as claimed in claim 6, wherein diagonally opposite end edges of each box elements are each provided with an extension of the end wall, said extensions projecting past the plane of the associated flat side surface a distance corresponding to half the distance between two adjacent, assembled box elements, two such extensions when mounted in opposite directions thereby forming a substantially gas-proof wall against the adjacent gas channel.

8. The filter as claimed in claim 7, wherein each box element is provided with an internal flange projecting from the end wall towards the interior of the box element and ending in a peat litter bed, said flange being intended to prevent gas from passing between the peat litter bed and the end wall of the box element.

9. A filter for filtering out solid particles from a gaseous medium comprising in combination
a box element having two spaced apart, substantially parallel flat side walls, the said flat side walls being connected by means of end walls to form a box-like structure, said flat side walls being provided with a plurality of openings for the passage of the gaseous medium to be filtered, a stratified bed of peat litter being arranged inside said box element, said stratified peat litter bed comprising at least two layers including a first layer containing peat litter the particle size of which ranges from a certain size value and upwards, and a second layer containing peat litter particles of sizes below the said size value, and
means arranged in said box element for positively guiding the gaseous medium through said peat litter bed in a direction into and through said first layer of peat litter and subsequently through said second layer of peat litter.

10. A filter unit for filtering out solid particles from a gaseous medium comprising in combination a plurality of box elements each one containing a stratified bed of peat litter, in which a first layer contains peat litter particles of sizes above a certain value and a second layer contains peat litter particles of a series below said certain value,
inlet and outlet openings being provided in each one of said box elements for leading the gas to be filtered through the box element in a direction into said first layer and through said second layer,
a housing in which said box elements are located with every second box element positioned opposite to the first box elements to allow inlet or outlet openings of each two adjacent box elements to be turned towards each other said housing having a gas inlet and a gas outlet, and
guiding means arranged in said housing for passing the gas to be filtered from the gas inlet to the inlet sides of the box elements and to lead away the filtered gas from the outlet sides of the box elements to said gas outlet.

* * * * *